(12) United States Patent
Gillard et al.

(10) Patent No.: US 9,988,538 B2
(45) Date of Patent: *Jun. 5, 2018

(54) BINDER FOR A SELF POLISHING ANTIFOULING COATING

(75) Inventors: Michel Gillard, Louvain-la-Neuve (BE); Florence Cattiaux, Saint-Saulve (FR); Marcel Vos, Ijmuiden (NL); Jos Prinsen, Bussum (NL)

(73) Assignee: PPG COATINGS EUROPE B.V. (NL)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/642,778

(22) PCT Filed: Apr. 20, 2011

(86) PCT No.: PCT/EP2011/056373

§ 371 (c)(1),
(2), (4) Date: Dec. 26, 2012

(87) PCT Pub. No.: WO2011/131742

PCT Pub. Date: Oct. 27, 2011

(65) Prior Publication Data

US 2013/0102726 A1 Apr. 25, 2013

(30) Foreign Application Priority Data

Apr. 20, 2010 (EP) .................................. 10160482

(51) Int. Cl.
| | | |
|---|---|---|
| *C08L 31/02* | (2006.01) | |
| *C09D 5/16* | (2006.01) | |
| *C09D 7/12* | (2006.01) | |
| *C08K 3/22* | (2006.01) | |

(52) U.S. Cl.
CPC ............ *C09D 5/1662* (2013.01); *C08L 31/02* (2013.01); *C09D 5/1668* (2013.01); *C09D 7/1216* (2013.01); *C08K 3/22* (2013.01)

(58) Field of Classification Search
CPC ..... C08D 5/1668; C08D 5/1675; C08L 31/02; C09D 5/1668; C09D 5/1662; C09D 5/16; C09D 5/1675; C09D 7/1216; C08K 3/22
USPC .......... 525/100, 446; 523/122; 524/563, 272
See application file for complete search history.

(56) References Cited

U.S. PATENT DOCUMENTS

| | | | | | |
|---|---|---|---|---|---|
| 4,594,365 | A | * | 6/1986 | Russell et al. ................. | 523/122 |
| 5,663,215 | A | * | 9/1997 | Milligan ........................ | 523/122 |
| 5,795,374 | A | * | 8/1998 | Itoh ...................... | C09D 5/1656 106/16 |
| 9,382,431 | B2 | * | 7/2016 | Gillard ................. | C09D 5/1668 |
| 2004/0138332 | A1 | | 7/2004 | Aubart et al. | |
| 2013/0090418 | A1 | | 4/2013 | Gillard et al. | |

FOREIGN PATENT DOCUMENTS

| | | |
|---|---|---|
| EP | 0 526 441 A1 | 7/1992 |
| EP | 0 802 243 A2 | 4/1997 |
| EP | 1 036 786 A1 | 3/1999 |
| EP | 0792326 B1 | 2/2000 |
| EP | 1 439 752 B1 | 10/2002 |
| EP | 1 342 756 A1 | 6/2003 |
| EP | 1 978 065 A1 | 12/2006 |
| JP | S55-98241 | 1/1979 |
| JP | S63-6068 | 1/1988 |
| JP | S63-215780 | 9/1988 |
| JP | H02-227410 | 9/1990 |
| JP | H01-132668 | 10/1993 |
| JP | H07-113002 | 5/1995 |
| JP | H10-30071 | 2/1998 |
| JP | H07-18216 | 9/1999 |
| JP | H11-246826 | 9/1999 |
| JP | 2002-146269 | 5/2002 |
| JP | 2002194270 A * | 7/2002 |
| JP | 2002-307764 | 10/2002 |
| JP | 2003-275672 | 9/2003 |
| JP | 2008031404 A * | 2/2008 |
| JP | 2003-261816 | 11/2009 |
| JP | 2010-084099 | 4/2010 |
| WO | WO 2004/085502 A1 | 10/2004 |
| WO | WO 2008/106494 A1 | 9/2008 |
| WO | WO 2009/007276 A1 | 1/2009 |
| WO | WO 2009/149919 | 12/2009 |

OTHER PUBLICATIONS

JP 2008-031404 A (2008), machine translation, JPO Advanced Industrial Property Network (AIPN).*
JP 2002-194270 A (2002), machine translation, JPO Advanced Industrial Property Network (AIPN).*
VeoVa™ 9 Monomer, Momentive, Technical Data Sheet (2011).*
International Search Report dated Aug. 5, 2011 issued in connection with PCT/EP2011/056327.
Written Opinion of the International Searching Authority dated Aug. 5, 2011 in connection with PCT/EP2011/056373.
International Search Report and Written Opinion of Int'l Searching Authority (dated Aug. 3, 2011) issued in connection with PCT/EP2011/056327.
Written Opinion of the International Searching Authority dated Nov. 1, 2012 in connection with PCT/EP2011/056327.
International Preliminary Report on Patentability dated Nov. 1, 2012 in connection with PCT Application No. PCT/EP2011/056373.
Office Action dated Jan. 30, 2015 in connection with Japanese Patent Application 2013-505484.
Office Action dated Nov. 20, 2015 in connection with Japanese Patent Application 2013-505475.

(Continued)

*Primary Examiner* — Josephine L Chang
(74) *Attorney, Agent, or Firm* — Goodwin Procter LLP

(57) ABSTRACT

A binder for a self polishing and/or antifouling coating composition comprising an oligomer or polymer composition, formed from at least 50% by weight of monomer units of a vinyl ester of versatic acid.

4 Claims, No Drawings

(56) References Cited

OTHER PUBLICATIONS

Office Action dated Dec. 16, 2016 in connection with Chinese Patent Application 201180019794.0.
"Functional and Intelligent High-Molecular-Weight Materials," Li Qingshan et al., National Defense Industry Press (Beijing), p. 245.
Office Action dated Feb. 6, 2017 in connection with Japanese Patent Application 2013-505484.

* cited by examiner

BINDER FOR A SELF POLISHING ANTIFOULING COATING

This is a national phase filing of International Application No. PCT/EP2011/056373, which was filed on Apr. 20, 2011 and published in English on Oct. 27, 2011 as WO 2011/131742, and claims priority of European Patent Application No. 10160482.5, filed on Apr. 20, 2010, the entire contents of which are incorporated herein by reference.

The present invention relates to a binder, particularly to a self polishing antifouling coating binder suitable for marine applications.

Coating compositions formulated to prevent the adhesion of micro-organisms, plants and animals to surfaces are well known in the art. An area where such coatings are of particular interest is in marine applications, where a surface is exposed to water which contains organisms that will adhere to the surface, thus fouling the surface. For example, if the surface is the hull of a ship, the increase in frictional resistance caused by the adhesion of organisms such as barnacles to the surface leads to a drastic reduction in the fuel efficiency of the ship.

Traditionally, there are two ways that a coating composition can be designed to prevent the adhesion and build up of fouling agents on a surface. Firstly, the coating can contain a biocide agent which serves to poison the organism attached to the surface, thus causing the organism to die and fall off the surface. This mode of adhesion prevention is often referred to as "antifouling" and such coatings often referred to as antifouling coatings.

Secondly, the coating may be designed to slowly degrade over time, thus organisms adhered to the surface will gradually fall off the surface with the degradation of the coating. The degradation is often caused by a slow hydrolysation of the coating (usually the binder within the coating). This mode of adhesion prevention is often referred to as "self polishing" and such coatings are often referred to as self polishing coatings. In some literature, this mode of adhesion prevention is referred to as "erodible" because the coating erodes over time.

In order to obtain an effective and efficient removal of organisms from surfaces it is now common practice to produce coating compositions that both contain a biocide and which slowly degrade over time. Such dual functional coatings are often referred to as self polishing antifouling coatings.

One aspect of self polishing (erodible) and/or antifouling coatings that can greatly affect the polishing rates or antifouling properties is the binder.

Known binders in self polishing and/antifouling coatings include acrylic polymers, vinyl copolymers; zinc and copper acrylates and rosin and resinates and mixtures thereof. However, known binders and co-binders may provide coatings with volume solids levels that are lower than is wished for the environment, workers and economics. Also, the polishing (erosion) rates of self polishing paints may not be high enough. Further, the use of low Mw binders and co-binders, required for a higher volume solids, can result in coatings that crack after significant time of immersion in seawater.

One of the aspects of the present invention is to provide an improved binder for marine self polishing (erodible) and/or antifouling coating compositions.

According to a first aspect of the present invention there is provided the use of an oligomer or polymer composition, formed from at least 50% by weight of monomer units of a vinyl ester of versatic acid as a binder in a self polishing and/or anti fouling coating composition.

By the term, "versatic acid" it is meant an acid or mixture of acids corresponding to the general formula $CR^5R^6CH_3CO_2H$ in which there is a total of 9 to 11 carbon atoms and each of $R^5$ and $R^6$ is an alkyl group. A general formula of versatic acid is shown in formula (i) below:

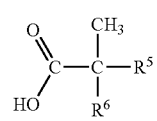

Formula (i)

Accordingly, the general formula of a vinyl ester of versatic acid is shown in formula (ii) below:

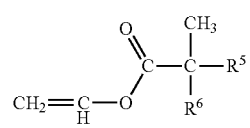

Formula (ii)

Wherein $R^5$ and $R^6$ each independently represents a $C_1$ to $C_7$ branched or unbranched alkyl group, but wherein the total number of carbon atoms in the vinyl ester of versatic acid of formula (ii) is between 11 and 13.

Accordingly, $R^5$ and $R^6$ may each independently be selected from a methyl group; an ethyl group; a linear or branched propyl group, a linear or branched butyl group; a linear, branched or cyclic pentyl group; a linear, branched or cyclic hexyl group; or a linear, branched or cyclic heptyl group.

For example, if $R^5$ is selected as a propyl group, then $R^6$ may be selected as any of a linear, branched or cyclic propyl, butyl or pentyl group, thereby making a vinyl ester of versatic acid having 11, 12 or 13 carbon atoms respectively.

It is especially preferred that the number of carbon atoms in the vinyl ester of versatic acid is 11, thus being a vinyl ester of a versatic acid having 9 carbon atoms.

Such vinyl esters of versatic acid are commercially available under the name "Veova"® from Momentive Chemicals.

The balance of the monomers required to make the polymer may be selected from one or more of any known co-monomer, preferably co-monomers having a single ethylenically unsaturated group therein.

Suitable co-monomers include the alkyl esters of acrylic acid and the alkyl esters of (alkyl)acrylic acids. For example, preferred co-monomers include $C_{1-4}$alkyl($C_{0-4}$alk)acrylates, such as: methyl acrylate, ethyl acrylate, propyl acrylate, butyl acrylate, methyl(meth)acrylate, ethyl(meth)acrylate, propyl(meth)acrylate, butyl(meth)acrylate, methyl(eth)acrylate, ethyl(eth)acrylate, propyl(eth)acrylate, butyl(eth)acrylate, methyl(prop)acrylate, ethyl(prop)acrylate, propyl(prop)acrylate, butyl(prop)acrylate, methyl(but)acrylate, ethyl(but)acrylate, propyl(but)acrylate, butyl(but)acrylate.

Other suitable co-monomers include vinyl monomers such as vinylchloride, vinyl ether, vinyl isobutyl ether, vinyl pyrolidone, vinyl acetate, vinyl alcohol, ethylene, propene, butadiene, and styrene.

The oligomeric or polymeric material may also include vinyl chloride, vinyl ether, vinyl isobutyl ether, vinyl acetate, vinyl alcohol Particularly preferred co-monomers include methyl acrylate, ethyl acrylate, propyl acrylate, butyl acrylate and methyl(meth)acrylate.

It will be appreciated that the co-monomers used with the vinyl ester of versatic acid may be any of the monomers mentioned below in relation to the co-binders. In particular, the co-monomers used with the vinyl ester of versatic acid may be one or more of the following monomers: alkyl acrylate; alkyl (alk)acrylate; $R^1_3$silyl acrylate, where each $R^1$ group is independently selected from hydrogen or any alkyl, alkenyl, alkynyl, aralkyl or aryl group; $R^2_3$silyl (alk)acrylate where each $R^2$ group is independently selected from hydrogen or any alkyl, alkenyl, alkynyl, aralkyl or aryl group; a monomer having the general formula II:

$$(R^3)_{4-m}Si(OR^4)_m \qquad \text{II}$$

where each $R^3$ is independently selected from hydrogen or any alkyl, alkenyl, alkynyl, aralkyl or aryl group, and where each $R^4$ is independently selected from hydrogen or any alkyl, alkenyl, alkynyl, aralkyl, aryl, and m=1 to 4.

In one embodiment, the co-monomer may include one or more vinyl silane monomer, wherein, according to Formula II, above, at least one $R^3$ group comprises a vinyl group, and wherein m=1 to 3. In such an embodiment, at least one $R^3$ group preferably comprises an ethenyl ($CH_2$=$CH$—) group.

In one embodiment, the co-monomer may include one or more methacryl silane monomer, wherein, according to Formula II, above, at least one $R^3$ group comprises a methacrylate group, and wherein m=1 to 3. In such an embodiment, at least one $R^3$ group preferably comprises an alkylene methacrylate.

Preferably, the polymer composition comprises at least about 60% by weight of monomer units of a vinyl ester of versatic acid, more preferably at least about 70% by weight, yet more preferably at least 80% by weight, and yet more preferably at least about 80% by weight.

In a particularly preferred embodiment, the polymer composition comprises at least about 90% by weight of monomer units of a vinyl ester of versatic acid and preferably at least about 95% by weight.

Most preferably, the polymer composition is substantially a homopolymer of monomer units of a vinyl ester of versatic acid. For example, the polymer composition may comprise at least about 98% by weight or preferably at least about 99% by weight of monomer units of a vinyl ester of versatic acid.

In one embodiment, the polymer composition is formed exclusively from monomer units of a vinyl ester of versatic acid.

Preferably, the binder of the second aspect may be in the coating composition of the first aspect, either as the only binder content or in combination with the other binders as mentioned above.

According to a second aspect of the present invention there is provided a binder for a self polishing and/or anti fouling coating composition, the binder comprising an oligomer or polymer composition, formed from at least 50% by weight of monomer units of a vinyl ester of versatic acid.

Preferably, the polymer composition comprises at least about 60% by weight of monomer units of a vinyl ester of versatic acid, more preferably at least about 70% by weight, yet more preferably at least 80% by weight, and yet more preferably at least about 80% by weight.

In a particularly preferred embodiment, the polymer composition comprises at least about 90% by weight of monomer units of a vinyl ester of versatic acid and preferably at least about 95% by weight.

Most preferably, the polymer composition is substantially a homopolymer of monomer units of a vinyl ester of versatic acid. For example, the polymer composition may comprise at least about 98% by weight or preferably at least about 99% by weight of monomer units of a vinyl ester of versatic acid.

According to a third aspect of the present invention there is provided a method of forming a binder for a self polishing and/or anti fouling coating composition, the method comprising polymerizing a monomer mixture comprising at least 50% by weight of monomer units of a vinyl ester of versatic acid. Preferably, the monomer mixture further comprises one or more initiators. The initiator may be a peroxide compound, such as di-t-amyl peroxide, for example.

According to a fourth aspect of the invention there is provided a self polishing and/or anti fouling coating composition comprising a binder of the second aspect.

Preferably, the coating composition is a marine coating composition a self polishing and/or anti fouling coating composition.

Preferably, the coating composition comprises one or more antifoulant. Preferably, the or each antifoulant comprises at least one metal oxide compound.

Preferably, the binder may further comprise one or more co-binders. The co-binder may comprise an oligomeric or polymeric material.

Preferably, the or each co-binder represents the balance of the binder to make 100% by weight.

The co-binder may comprise an acrylate material, such as a polyacrylate material. The co-binder may comprise a silyl acrylate material, such as a poly silyl acrylate material.

The co-binder may comprise a metal acrylate material, such as copper acrylate or zinc acrylate.

The oligomeric or polymeric material of the co-binder may be formed from one or more monomer. In other words, the oligomeric or polymeric material may be a homopolymer/homooligomer or a copolymer/cooligomer (terpolymer/teroligomer etc).

The co-binder may comprise one or more oligomeric or polymeric material.

Preferably, the oligomeric or polymeric material of the co-binder is formed from one or more of the following monomers: alkyl acrylate; alkyl (alk)acrylate; $R^1_3$silyl acrylate, where each $R^1$ group is independently selected from any alkyl, alkenyl, alkynyl, aralkyl or aryl group; $R^2_3$silyl (alk)acrylate where each $R^2$ group is independently selected from any alkyl, alkenyl, alkynyl, aralkyl or aryl group; a monomer having the general formula II:

$$(R^3)_{4-m}Si(OR^4)_m \qquad \text{II}$$

where each $R^3$ is independently selected from any alkyl, alkenyl, alkynyl, aralkyl or aryl group, and where each $R^4$ is independently selected from hydrogen or any alkyl, alkenyl, alkynyl, aralkyl, aryl, and m=1 to 4.

In one embodiment, the binder as described herein is particularly advantageous when used as the binder or as at least one of the binders in a coating composition, the coating composition comprising:
  i) a carboxylic acid;
  ii) at least one metal oxide compound; and
  iii) one or more binder, the binder comprising an oligomer or polymer composition, formed from at least 50% by weight of monomer units of a vinyl ester of versatic acid.

In a further embodiment, the binder as described herein is particularly advantageous when used as the binder or as at least one of the binders in a coating composition comprising:

i) a carboxylic acid;
ii) at least one metal oxide compound;
iii) a dehydrating agent; and
iv) one or more binder;

characterised in that, in the production of the coating composition, the dehydrating agent iii) is contacted with either of component i) or ii), prior to the addition of the other of component i) or ii).

Advantageously, it has been surprisingly found that the contacting of the dehydrating agent to either of component i) or ii), prior to the addition of the other of component i) or ii) during the production of the coating composition results in a coating composition having little or no metal resinate. Such a coating has been surprisingly found to display advantageous properties such as better self polishing rates, as compared to coatings where higher degree of metal resinates are formed. Furthermore, such a coating has been shown to have a faster and more constant erosion rate. This is beneficial for the performance and use in ships in (sub) tropical areas and on slower moving vessels and vessels with low operation rates <70%). Also, the present coating composition has higher volume solids than prior art coatings (typically about 70% instead of about 55%). This makes the coating composition more economic and more environmentally friendly (typically about 33% less solvent emission) in use.

While not wishing to be bound to any theory, it is believed that the reaction of the carboxylic acid and the metal oxide compound requires trace amounts of water as a catalyst to start the reaction. The reaction between the carboxylic acid and metal oxide then liberates further water thereby accelerating the reaction. Accordingly, adding the dehydrating agent iii) to either of ingredient i) or ii), prior to the addition of the other of ingredient i) or ii) removes trace water from the system prior to any reaction of carboxylic acid and metal oxide compound.

It will be appreciated by one skilled in the art that the dehydrating agent iii) may be added to a solvent or other components of the coating composition prior to the addition of the carboxylic acid i) or the at least one metal oxide compound II), following which either of component i) or ii) may be added, prior to the addition of the other of component i) or ii).

Preferably, the dehydrating agent is contacted and mixed with either of component i) or ii), prior to the addition of the other of component i) or ii).

In one embodiment, the dehydrating agent is contacted with either of component i) or ii) and then, after an elapsed a time period, T, the other of component i) or ii) is added. Preferably, the time period, T, is at least 5 seconds, more preferably at least 30 seconds and yet more preferably at least 1 minute.

Preferably, the dehydrating agent is contacted with either of component i) or ii) in such conditions of time, temperature, pressure and, optionally, mixing, that the dehydrating agent is sufficiently homogeneously divided through the mixture of dehydrating agent and component i) or ii) to substantially remove any water therefrom, prior to the addition of the other of component i) or ii).

Preferably, the dehydrating agent is contacted with either of component i) or ii) in such conditions of time, temperature, pressure and, optionally, mixing, that the dehydrating agent is sufficiently homogeneously divided through the mixture of dehydrating agent and component i) or ii) to substantially prevent the formation of metal resinate, when the other of component i) or ii) is added.

Preferably, the carboxylic acid comprises one or more of the following: rosin or a hydrogenated derivative thereof; any $C_1$ to $C_{20}$ optionally substituted, linear, branched or cyclic mono, di or tri carboxylic acid; fatty acids; acrylic acids; (alkyl)acrylic acids; adipic acid; benzoic acid; naphthenic acid; ethylhexyl carboxylic acid; methanoic acid; ethanoic acid; propanoic acid; butanoic acid; pentanoic acid; cyclopentanoic acid; hexanoic acid; cyclohexanoic acid; methyl benzoic acid.

The carboxylic acid may also include a polymer or oligomer having carboxylic acid functionality, preferably on side groups thereof. For example, the carboxylic acid may be any polyester, polyacrylate or alkyd polymer or oligomer having carboxylic acid functionality. Examples of suitable carboxylic acid functional polymers are disclosed in WO 2004/085502 and the contents thereof are incorporated herein by reference.

The carboxylic acid group containing polymer may be any suitable coating polymer having acid groups on the side chains thereof. The acid group containing polymers can be homo or co-polymers (including terpolymers, etc) having acid groups in the side chains such as those derived from one or more monomers such as: vinyl monomers including acrylic acid, alkacrylic acids such as methacrylic acid, polyester monomers; alkyd monomers; and epoxy resin monomers.

In a most preferred embodiment, the carboxylic acid comprises rosin or a hydrogenated derivative thereof.

The term "rosin" as used herein refers to the product of a harvesting of the gum exudations from surface cuts made in certain species of trees. Rosin is sometimes defined restrictively as the product obtained from pines. However, similar products comprised in the generic term "rosin" as used herein include Congo copal, Kauri copal, Damar and Manilla gums. Other processes for obtaining "rosin" as used herein include dissolving wood rosin from pine stumps after forests have been felled, or refining a by-product of the kraft paper manufacturing process to produce tall oil rosin. Rosin typically comprises a mixture of resin acids, chiefly abietic acid, being a polycyclic mono carboxylic acid. Accordingly, "rosin" as used herein also refers to such mixtures. Rosin as used herein also refers to synthetically produced rosin or resin acids and to pure or substantially pure resin acids, such as abietic acid.

The hydrogenated derivatives of rosin include partially or fully hydrogenated rosin. For example, the principle component in rosin is abietic acid, which contains two sites of ethylenic unsaturation. Hence, partially hydrogenated rosin may refer to rosin in which one of the sites of ethylenic unsaturation in abietic acid has been hydrogenated, whereas fully hydrogenated rosin may refer to rosin in which both of the sites of ethylenic unsaturation in abietic acid have been hydrogenated.

Preferably, the carboxylic acid is present in the coating composition in an amount of between about 5 and 50 wt %, more preferably between about 5 and 40 wt %, more preferably between about 10 and 30 wt % and yet more preferably between about 12 and 25 wt %.

The metal oxide compound is preferably selected from one or more of the following: copper (I) oxide; copper (II) oxide; zinc oxide; iron (II) oxide; iron (III) oxide; CaO; MgO; $TiO_2$; $MnO_2$.

Especially preferred metal oxide compounds are selected from one or more of copper (I) oxide, zinc oxide and iron (III) oxide.

Preferably, the at least one metal oxide compound is present in the coating composition in an amount of up to about 90 wt %, more preferably up to about 80 wt % and most preferably up to about 70 wt %.

Preferably, the at least one metal oxide compound is present in the coating composition in an amount of at least about 10 wt %, more preferably at least about 20 wt %, and yet more preferably at least about 30 wt %.

Preferably, the at least one metal oxide compound is present in the coating composition in an amount of between about 20 and 70 wt %, more preferably between about 30 and 65 wt % and yet more preferably between about 40 and 60 wt %.

Preferably, the dehydrating agent is any agent capable of removing water from the composition. Preferably, the dehydrating agent is inorganic. Preferred dehydrating agents include one or more of the following: sylosiv; sylosiv A4; anhydrous gypsum ($CaSO_4$); synthetic zeolite adsorbents (trade name: Molecular Sieve, etc.); orthoesters such as methyl orthoformate and methyl orthoacetate; orthoboric esters; silicates and isocyanates (trade name: Additive T1). In particular, anhydrous gypsum and Molecular Sieve are preferred as dehydrating agent. Dehydrating agents can be used individually or in any combination.

Preferably, the dehydrating agent is present in the coating composition in an amount of between about 0.1 and 10 wt %, more preferably in an amount of between about 0.5 and 8 wt % and yet more preferably in an amount of between about 1 and 5 wt %.

The term "alk" or "alkyl", as used herein unless otherwise defined, relates to saturated hydrocarbon radicals being straight, branched, cyclic or polycyclic moieties or combinations thereof and contain 1 to 20 carbon atoms, preferably 1 to 10 carbon atoms, more preferably 1 to 8 carbon atoms, still more preferably 1 to 6 carbon atoms, yet more preferably 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by one or more oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like.

The term "alkenyl", as used herein, relates to hydrocarbon radicals having one or several, preferably up to 4, double bonds, being straight, branched, cyclic or polycyclic moieties or combinations thereof and containing from 2 to 18 carbon atoms, preferably 2 to 10 carbon atoms, more preferably from 2 to 8 carbon atoms, still more preferably 2 to 6 carbon atoms, yet more preferably 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by one or more oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like.

The term "alkynyl", as used herein, relates to hydrocarbon radicals having one or several, preferably up to 4, triple bonds, being straight, branched, cyclic or polycyclic moieties or combinations thereof and having from 2 to 18 carbon atoms, preferably 2 to 10 carbon atoms, more preferably from 2 to 8 carbon atoms, still more preferably from 2 to 6 carbon atoms, yet more preferably 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or lower alkyl, and/or be interrupted by one or more oxygen or sulphur atoms, or by silano or dialkylsiloxane groups. Examples of such radicals may be independently selected from alkynyl radicals include ethynyl, propynyl, propargyl, butynyl, pentynyl, hexynyl and the like.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or lower alkyl, and/or be interrupted by one or more oxygen or sulphur atoms, or by silano or dialkylsilicon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like.

The term "aralkyl" as used herein, relates to a group of the formula alkyl-aryl, in which alkyl and aryl have the same meaning as defined above and may be attached to an adjacent radical via the alkyl or aryl part thereof. Examples of such radicals may be independently selected from benzyl, phenethyl, dibenzylmethyl, methylphenylmethyl, 3-(2-naphthyl)-butyl, and the like The term "Het", when used herein, includes four-to-twelve-membered, preferably four-to-ten-membered ring systems, which rings contain one or more heteroatoms selected from nitrogen, oxygen, sulphur and mixtures thereof, and which rings may contain one or more double bonds or be non-aromatic, partly aromatic or wholly aromatic in character. The ring systems may be monocyclic, bicyclic or fused. Each "Het" group identified herein is optionally substituted by one or more substituents selected from halo, cyano, nitro, oxo, lower alkyl (which alkyl group may itself be optionally substituted or terminated as defined below) $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$ or $C(S)NR^{25}R^{26}$ wherein $R^{19}$ to $R^{27}$ each independently represent hydrogen, aryl or lower alkyl (which alkyl group itself may be optionally substituted or terminated as defined below). The term "Het" thus includes groups such as optionally substituted azetidinyl, pyrrolidinyl, imidazolyl, indolyl, furanyl, oxazolyl, isoxazolyl, oxadiazolyl, thiazolyl, thiadiazolyl, triazolyl, oxatriazolyl, thiatriazolyl, pyridazinyl, morpholinyl, pyrimidinyl, pyrazinyl, quinolinyl, isoquinolinyl, piperidinyl, pyrazolyl and piperazinyl. Substitution at Het may be at a carbon atom of the Het ring or, where appropriate, at one or more of the heteroatoms.

"Het" groups may also be in the form of an N oxide.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

The oligomeric or polymeric material may be formed from one or more of the following monomers: $C_1$-$C_{10}$alkyl ($C_0$-$C_{10}$alk)acrylate; trialkyl or trialkoxy silyl ($C_0$-$C_{10}$alk) acrylate. Particularly preferred monomers are alkyl acrylates and alkyl (alk)acrylates such as: methyl acrylate, ethyl acrylate, propyl acrylate, butyl acrylate, methyl(meth)acrylate, ethyl(meth)acrylate, propyl(meth)acrylate and butyl (meth)acrylate.

The oligomeric or polymeric material may also include vinyl chloride, vinyl ether, vinyl isobutyl ether, vinyl acetate, vinyl alcohol.

The co-binder may comprise zinc acrylate. The binder may comprise copper acrylate.

Preferably the co-binder is an inert binder. By the term inert binder it is meant a binder that is not chemically reactive toward common self polishing antifouling coating ingredients such as zinc oxide, cuprous oxide, iron oxide, rosin (with reactive carboxylic acid group and double bonds), thixotropic agents, etc. under the conditions in which the coating is prepared, administered or used.

Preferably, the co-binder is also inert with regard to seawater, thus no excessive swelling and/or water uptake and no hydrolysis of the coating occurs upon extended exposure to seawater.

In one embodiment, as discussed above, the carboxylic acid may also include a polymer or oligomer having carboxylic acid functionality, preferably on side groups thereof. It is therefore possible that the carboxylic acid (i) and the one or more co-binder (iv) are both comprised in a single component. In other words, the polymer or oligomer having carboxylic acid functionality may also represent the one or more co-binder.

It is also possible for rosin to act as a co-binder. Accordingly, where the carboxylic acid (i) is selected as rosin, the rosin may also be the one or more co-binder (iv).

The coating composition may comprise only one binder. However, in one embodiment, the coating composition may comprise two or more binders.

Preferably, the binder is present in the coating composition in an amount of between about 0.1 and 20 wt %, more preferably, between about 0.5 and 10 wt %, more preferably between about 1 and 5 wt %.

The coating composition may contain other components such as solvents, pigments, thixotropic agents, biocides etc.

The solvent may be an organic solvent, such as xylene, toluene, ketones (acetone, MIBK, MAK etc), high boiling aromatic solvents, ethyl acetate and butyl acetate, for example.

Pigments may be selected from one or more of iron (III) oxide, titanium dioxide, zinc oxide etc. It will be appreciated by one skilled in the art that many pigments are metal oxide compounds. In such a scenario, in the context of the present invention, it should be appreciated that the pigment should be treated as a metal oxide compound and should therefore be added to the dehydrating agent of the composition prior to adding the carboxylic acid, or added to the composition after the dehydrating agent is added to the carboxylic acid.

In one embodiment, the coating composition may also comprise a metal resinate, such as zinc resinate, copper resinate, calcium resinate or magnesium resinate.

The metal resinate may be present in the coating composition in an amount of between about 0.1 to 10% by weight, preferably between about 1 and 8% by weight and most preferably between about 3 and 6% by weight.

According to a sixth aspect of the invention there is provided a coating composition comprising a carboxylic acid and at least one metal oxide compound, which coating composition contains less than 3% by weight of metal carboxylate.

Preferably, the coating composition comprises less than 2.5% metal carboxylate by weight, more preferably, less than about 2% by weight, yet more preferably less than about 1.5% by weight. In a particularly preferred embodiment, the coating composition comprises less than 1% metal carboxylate by weight, more preferably, less than about 0.5% by weight.

Preferably, the coating composition comprises substantially no metal carboxylate.

Preferably, the carboxylic acid is rosin or a hydrogenated derivative thereof and therefore, the metal carboxylate is preferably a metal resinate.

The present invention also extends to a marine vessel or marine structure coated with a coating composition according to the above aspects of the present invention.

According to a yet further aspect of the present invention there is provided a method of forming a coating composition, the coating composition comprising:
  i) a carboxylic acid;
  ii) at least one metal oxide compound;
  iii) a dehydrating agent; and
  iv) one or more binder, the binder comprising an oligomer or polymer composition, formed from at least 50% by weight of monomer units of a vinyl ester of versatic acid;
the method comprising contacting the dehydrating agent iii) with either of component i) or ii), prior to the addition of the other of component i) or ii).

All of the features contained herein may be combined with any of the above aspects and in any combination.

The invention will be further discussed with reference to the following non-limiting examples.

In the examples, the following test methods were employed:

Test Methods

Can Stability: The paint is stored in a closed can at 40° C. and the viscosity determined at regular intervals; here after 18 weeks.

Determination of the Viscosity: The viscosity was measured using a Haake VT 181 (body E30 or 100) viscosimeter under standard conditions[ASTM test method D2196-86].

Evaluation of the Polishing of Paints: The erosion rate is the average decrease in film thickness (expressed in μm/month) per month over the whole test.

Stainless steels discs, 20 cm in diameter, were protected with a standard anti-corrosive system (300 μm in dry film thickness). Two layers of the self-polishing paint to be tested were applied, to give a total dry film thickness between 200 and 300 μm. The tests were carried out in constantly refreshed natural seawater, at a constant temperature of 20° C. The discs were rotated at 1000 rpm, corresponding to about 34 km/h (18 knots) at 9 cm from the center.

The total dry film thickness was determined at 2 monthly intervals, after allowing the paint to dry during one day. It was measured at a number of fixed points, each located at 4,5 and 6,6 and 9 cm from the center of the discs.

The evaluation of the antifouling activity of the paints: The antifouling activity was tested by applying the prepared paints to a panel over anti-corrosive paint, mounting the panel on a frame and immersing the frame from a raft in a seawater estuary off the Southern Netherlands during the active season (March to October). Each test also included panels coated with a non-toxic control (which became heavily fouled with seaweed and some animal life within 4 weeks). The fouling rate is reported by stating the area covered with fouling.

EXAMPLES

The Veova 9 homopolymer solution used herein was prepared as follows:

| | |
|---|---|
| Xylene | 18.505 Kg |
| Veova 9 | 74.019 Kg |
| Luperox DTA | 0.814 Kg |
| Xylene | 6.662 Kg |

Luperox DTA is a peroxide initiator, being Di-t-amyl peroxide solution commercially available from Arkema Step 1
Under nitrogen and constant agitation speed, reactor with xylene charge is heated at 135° C.
Step 2
At 135° C., monomer mixture and initiator are added in the reactor at a constant rate during 3 hours. When the addition is complete, keep the reactor at 135° C. for 60 minutes.
Step 3
Add 0.15 g of Luperox DTA and repeat addition three times after 60 minutes.
Step 4
Cooling at 110° C. and dilution with xylene.
Step 5
Adjust viscosity with xylene.

After preparation, a solution with a solids content of 74.6% and a viscosity (Haake, 23° C.) of 49.4 dPa·s is obtained. The Mw of the solution (measured by GPC, with polystyrene standards) is 7900, with a polydispersity of 2.3

Alternatively, a veova polymer or copolymer may be prepared by solution copolymerisation, as described in WO 02/066529, in particular in the examples of this document.

Example Formulation 1

| | |
|---|---|
| Xylene | 13.04 |
| Sylosiv A4 | 2.90 |
| Foral AX-E | 18.56 |
| Veova 9 homopolymer solution | 2.68 |
| Disparlon 6650 | 0.91 |
| Bayferrox 130 BM | 7.27 |
| Zineb Nautec | 8.86 |
| Cuprous oxide | 45.78 |
| Total | 100.00 |

Sylosiv A4 (RTM) is a zeolite dehydrating agent (water scavenger) commercially available from Grace
Foral AX-E (RTM) is a fully hydrogenated rosin, commercially available from Eastman
Disparlon 6650 (RTM) is a polyamide wax thixotropic agent, commercially available from Kusumoto
Bayferrox 130 BM (RTM) is an iron oxide pigment, commercially available from Lanxess
Zineb Nautec (RTM) is a biocide, commercially available from United Phosphorus
Veova 9 (RTM) commercially available from Momentive Chemicals The ingredients of example formulations 1 were then mixed according to preparation method 1 to form Coating 1. Details of preparation method 1 are detailed hereunder.

Preparation Method 1

| Addition 1 |
|---|
| rosin solution |
| co-binder solution |
| drying agent |
| Thix/anti-sagging agent |
| Disperse until homogenously divided |
| Addition 2 |
| Colouring pigment (optional) |
| Fillers (Non-reactive with rosin; optional) |
| Algicide (optional) |
| Addition 3 |
| Cuprous oxide |
| Disperse |

Results
Coating 1 was tested for polishing rates and fouling rates. The results are given in the following table.

| | Can stability at 40° C. Viscosity in dPa · s at 23° C. [% Copper resinate by IR] | | Polishing rate Over 18 months At 9-13-18 knots | Fouling rate After 12 months |
|---|---|---|---|---|
| | T = 0 | T = 18 weeks | [μm/month] | static on raft |
| Coating 2 | 20 [0, 0] | 26 [0, 5] | 7; 8; 10 | 75% area slime No Algae No hard fouling |

Examples Formulations 2 to 4

Further example formulations were prepared, each according to preparation method 1 discussed above, and with the following components.

Example Formulation 2

| | |
|---|---|
| Xylene | 10.72 |
| Sylosiv A4 | 2.89 |
| Foral AX-E | 17.12 |
| Veova 9 homopolymer solution | 2.14 |
| Polyace NSP-100 | 4.52 |
| Disparlon 6650 | 0.89 |
| Bayferrox 130 BM | 7.24 |
| Zineb Nautec | 8.83 |
| Cuprous oxide | 45.64 |
| Total | 100.00 |

Polyace NSP-100 is a silylacrylate binder, having a solid content of 50% and being commercially available from Nitto Kasei.

Example Formulation 3

| | |
|---|---|
| Xylene | 11.08 |
| Sylosiv A4 | 2.89 |
| Foral AX-E | 16.64 |
| Veova 9 homopolymer solution | 2.47 |
| Zinc acrylate (45% solids) $ | 4.35 |
| Disparlon 6650 | 0.90 |

-continued

| | |
|---|---|
| Bayferrox 130 BM | 7.24 |
| Zineb Nautec | 8.82 |
| Cuprous oxide | 45.60 |
| Total | 100.00 |

$ zinc acrylate was prepared according example C1 of U.S. Pat. No. 5,631,308

Example Formulation 4

| | |
|---|---|
| Xylene | 11.08 |
| Sylosiv A4 | 2.89 |
| Foral AX-E | 16.64 |
| Veova 9 homopolymer solution | 2.47 |

-continued

| | |
|---|---|
| Bremazit 3050 (50% in xylene)# | 4.35 |
| Disparlon 6650 | 0.90 |
| Bayferrox 130 BM | 7.24 |
| Zineb Nautec | 8.82 |
| Cuprous oxide | 45.60 |
| Total | 100.00 |

Bremazit 3050 is a solid zinc resinate commercially available from Robert Kraemer GmbH.

Examples 5 to 7 and Reference Examples 1 to 3

The table below shows examples 5 to 7 along side reference examples 1 to 3. These examples show comparative data for coatings having alternative co-binders and antifoulants

| | Description | | | | | |
|---|---|---|---|---|---|---|
| | Ex. 5 | Ref ex 1 | Ex. 6 | Ref ex 2 | Ex. 7 | Ref ex 3 |
| Co-Binder | Veova | Laroflex | Veova | Larofex | Veova | NeocB725 |
| Rosin/zinc resinate | Rosin | Rosin | Rosin | Rosin | Zn-resinate | Zn-resinate |
| Cu₂O/Econea | Econea | Econea | Cu₂O | Cu₂O | Econea | Econea |
| Ingredients | | | | | | |
| Veova 9 polymer (at 75 w % solids in xylene) | 7.5 | | 7.0 | | 12.0 | |
| Laroflex MP35 | | 5.5 | | 5.0 | | |
| Neocryl B725 | | | | | | 9.0 |
| Gum Rosin | 16.5 | 16.5 | 13.0 | 13.0 | | |
| Bremazit 3050 | | | | | 20.0 | 20.0 |
| Sea-nine | 15.0 | 15.0 | 10.0 | 10 | | |
| Dissolve the solid binders | | | | | | |
| Then add and disperse | | | | | | |
| Crayvallac Ultra | 1.0 | 1.0 | | | | |
| Disparlon 6650 | | | 1.0 | 1.0 | 1.0 | 1.0 |
| Econea | 5.0 | 5.0 | | 0 | 5.0 | 5.0 |
| Zinc pyrithione | | | | | 5.0 | 5.0 |
| zineb | | | | | 5.0 | 5.0 |
| Bayferrox 130 BM | 10.0 | 10.0 | 5.0 | 5.0 | 10.0 | 10.0 |
| Zinc oxide | 15.0 | 15.0 | 5.0 | 5.0 | | |
| China Clay E | 20.0 | 20.0 | 14.0 | 14.0 | 14.0 | 14.0 |
| Talcum m15 | | | | | 8.0 | 8.0 |
| Cuprous oxide | | | 40.0 | 40.0 | | |
| Xylene | 10.0 | 17.0 | 5.0 | 12 | 20.0 | 29.0 |
| Total | 100.0 | 105.0 | 100.0 | 105.0 | 100.0 | 106.0 |
| Properties | | | | | | |
| Viscosity (dPa · s) | 15 | 14 | 16 | 15 | 14 | 16 |
| Volume solids % | 62 | 57 | 69 | 61 | 63 | 58 |
| W % solids | 78 | 74 | 86 | 82 | 77 | 73 |
| VOC (g/L) | 336 | 382 | 273 | 341 | 319 | 365 |
| Density | 1.51 | 1.47 | 2.00 | 1.90 | 1.37 | 1.34 |

-continued

|  | Description | | | | | |
| --- | --- | --- | --- | --- | --- | --- |
|  | Ex. 5 | Ref ex 1 | Ex. 6 | Ref ex 2 | Ex. 7 | Ref ex 3 |
| Performance (12 months) | | | | | | |
| Raft panel (Malta); % of area covered w. slime; No algae or hard fouling | 13 | 13 | 20 | 25 | 10 | 10 |
| Erosion rate at 18 knots (μm/month) | 4 | 2 | 8 | 4 | 6 | 3 |

Veova 9 monomer (RTM) commercially available from Momentive Chemicals
Neocryl B725 (RTM) is a BMA/MMA copolymer commercially available from DSM
Laroflex MP35 is a vinylchloride-vinylisobutyl ether co-polymer commercially available from BASF
Disparlon 6650 (RTM) is a polyamide wax thixotropic agent, commercially available from Kusumoto
Bremazit 3050 is a zinc resinate commercially available from Kraemer
Crayvallac Ultra is a thix agent from Cray Valley
Bayferrox 130 BM (RTM) is an iron oxide pigment, commercially available from Lanxess
Zineb Nautec (RTM) is a biocide, commercially available from United Phosphorus
Sea-nine is an algicide, DCOIT (31 w % solution in xylene) available form Dow
Econea is a biocide available from Janssen
Zinc pyrithione is commercially available under the name Zinc Omadine from Arch
China Clay is available in different qualities from Brenntag NV
Zinc oxide is a paint pigment available from Umicore As is clearly shown in the above table, the self polishing erosion rate is greatly increased by using veova binder.

Furthermore, the antifouling rate is either maintained or enhanced by using the veova binder.

As can be seen from the above examples, a binder according to the present invention is particularly suitable for marine self polishing (erodible) and/or antifouling coatings and offers particular advantages with regard to self polishing rates, resistance to cracking and provides coatings with higher volume solids than traditional high Mw co-polymers.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A marine self-polishing or self-polishing and anti-fouling coating composition comprising a binder, wherein the binder comprises an oligomer or polymer composition, wherein the oligomer or polymer composition is formed exclusively from monomer units of a vinyl ester of versatic acid, wherein the coating composition comprises one or more antifoulant.

2. The marine self-polishing or self-polishing and anti-fouling coating composition of claim 1, wherein the number of carbon atoms in the vinyl ester of versatic acid is 11, thus being a vinyl ester of a versatic acid having 9 carbon atoms.

3. A marine self-polishing or self-polishing and anti-fouling coating composition, the coating composition comprising:
   i) a carboxylic acid;
   ii) at least one metal oxide compound; and
   iii) one or more binder, the binder comprising an oligomer or polymer composition, formed exclusively from monomer units of a vinyl ester of versatic acid.

4. A method of forming a marine self-polishing or self-polishing and anti-fouling coating composition, the coating composition comprising:
   i) a carboxylic acid;
   ii) at least one metal oxide compound;
   iii) a dehydrating agent; and
   iv) one or more binder, the binder comprising an oligomer or polymer composition, formed exclusively from monomer units of a vinyl ester of versatic acid;
the method comprising contacting the dehydrating agent iii) with either of component i) or ii), prior to the addition of the other of component i) or ii).

* * * * *